United States Patent
Cathier et al.

(10) Patent No.: US 7,529,395 B2
(45) Date of Patent: May 5, 2009

(54) SHAPE INDEX WEIGHTED VOTING FOR DETECTION OF OBJECTS

(75) Inventors: Pascal Cathier, Bures (FR); Xiangwei Zhang, Iowa City, IA (US); Jonathan Stoeckel, Exton, PA (US); Matthias Wolf, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 595 days.

(21) Appl. No.: 11/067,542

(22) Filed: Feb. 24, 2005

(65) Prior Publication Data

US 2006/0120591 A1 Jun. 8, 2006

Related U.S. Application Data

(60) Provisional application No. 60/633,963, filed on Dec. 7, 2004.

(51) Int. Cl.
*G06K 9/00* (2006.01)
(52) U.S. Cl. ........................ 382/128; 128/922
(58) Field of Classification Search ................. 382/100, 382/128, 130, 131, 132, 181, 190, 195, 133; 128/922; 378/4–27
See application file for complete search history.

(56) References Cited

U.S. PATENT DOCUMENTS

| 5,351,310 | A * | 9/1994 | Califano et al. ............. 382/199 |
| 7,023,441 | B2 * | 4/2006 | Choi et al. .................. 345/441 |
| 7,027,631 | B2 * | 4/2006 | Takeo et al. ................. 382/132 |
| 2004/0086161 | A1 * | 5/2004 | Sivaramakrishna et al. . 382/131 |
| 2005/0147297 | A1 * | 7/2005 | McLaughlin et al. ........ 382/171 |
| 2005/0152588 | A1 * | 7/2005 | Yoshida et al. .............. 382/128 |
| 2005/0152591 | A1 * | 7/2005 | Kiraly et al. ................ 382/131 |

* cited by examiner

*Primary Examiner*—Anand Bhatnagar

(57) ABSTRACT

In one aspect of the present invention, a method for calculating a response value at a first voxel indicative of a global shape in an image is provided. The method includes the steps of (a) determining at least one local shape descriptor associated with each of the at least one local shape descriptor; (b) determining a spread function associated with the each of the at least one local shape descriptor; (c) determining second voxels around the first voxel; (d) calculating values for each the at least one local shape descriptor at each of the second voxels; (e) determining a contribution of each of the second voxels at the first voxel based on the spread functions; and (f) using a combination function to combine the contributions to determine the response value indicative of the global shape.

20 Claims, 3 Drawing Sheets

SHAPE INDEX WEIGHTED VOTING FOR DETECTION OF OBJECTS

CROSS-REFERENCE TO RELATED APPLICATIONS

This application claims priority to U.S. Provisional Application No. 60/633,963, which was filed on Dec. 7, 2004, and which is fully incorporated herein by reference.

BACKGROUND OF THE INVENTION

1. Field of the Invention

The present invention relates generally to the field of medical imaging, and, more particularly, to introducing a shape index into weighted voting schemes for detecting objects in an image.

2. Description of the Related Art

Lung cancer is one of the most lethal kinds of cancer worldwide. Its cure depends critically on disease detection in the early stages. Computed tomography ("CT") technology is an important tool for detecting and diagnosing pulmonary nodules. Due to the large amount of image data generally created by thoracic CT examination, interpreting lung CT images to detect nodules can be a very challenging task for radiologists and other health professionals. Computer-aided diagnosis ("CAD") is a widely-accepted tool for aiding radiologists in interpreting lung nodule CT images.

A number of techniques for detecting nodules have been developed based on chest radiographs or CT images. A first approach obtains nodule candidates using multiple gray-level thresholding methods. Then a rule-based approach using two-dimensional ("2D") geometric features assigns a confidence rating to each suspected area. A second approach introduces sphericity as a three dimensional ("3D") feature, and includes additional gray-level features to a linear discriminant analysis ("LDA") classifier. A third approach uses a fuzzy clustering method to segment the entire lung into two parts: a) air part, and b) blood vessels and nodules. Then, a rule-based method classifies the nodule candidates. Neural network ("NN") methods have also been developed for detecting nodules. For example, to localize nodules in chest radiographs, a fourth approach establishes 2 NNs, with the first one detecting the suspected areas, and the second one acting as a classifier. In a fifth approach, which uses template-based methods for detecting CT nodule, Gaussian distribution of gray-level simulate nodules. Simulated sphere-like nodule templates detect nodules in the lung area using 3D processing techniques. Half-circle templates detect lung wall nodules based on 2D operations.

SUMMARY OF THE INVENTION

In one aspect of the present invention, a method for calculating a response value at a first voxel indicative of a global shape in an image is provided. The method includes the steps of (a) determining at least one local shape descriptor associated with each of the at least one local shape descriptor; (b) determining a spread function associated with the each of the at least one local shape descriptor; (c) determining second voxels around the first voxel; (d) calculating values for each the at least one local shape descriptor at each of the second voxels; (e) determining a contribution of each of the second voxels at the first voxel based on the spread functions; and (f) using a combination function to combine the contributions to determine the response value indicative of the global shape.

In another aspect of the present invention a machine-readable medium having instructions stored thereon for execution by a processor to perform a method for calculating a response value at a first voxel indicative of a global shape in an image is provided. The method includes the steps of (a) determining at least one local shape descriptor associated with each of the at least one local shape descriptor; (b) determining a spread function associated with the each of the at least one local shape descriptor; (c) determining second voxels around the first voxel; (d) calculating values for each the at least one local shape descriptor at each of the second voxels; (e) determining a contribution of each of the second voxels at the first voxel based on the spread functions; and (f) using a combination function to combine the contributions to determine the response value indicative of the global shape.

In yet another aspect of the present invention, a method for enhancing the detection specificity of the MARS filter in an image is provided. The image includes image points. The method includes the steps of determining local shape descriptor points based on a value of a local shape descriptor, wherein the local shape descriptor points comprises at least a subset of the image points; and performing MARS tracking using the local shape descriptor points.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
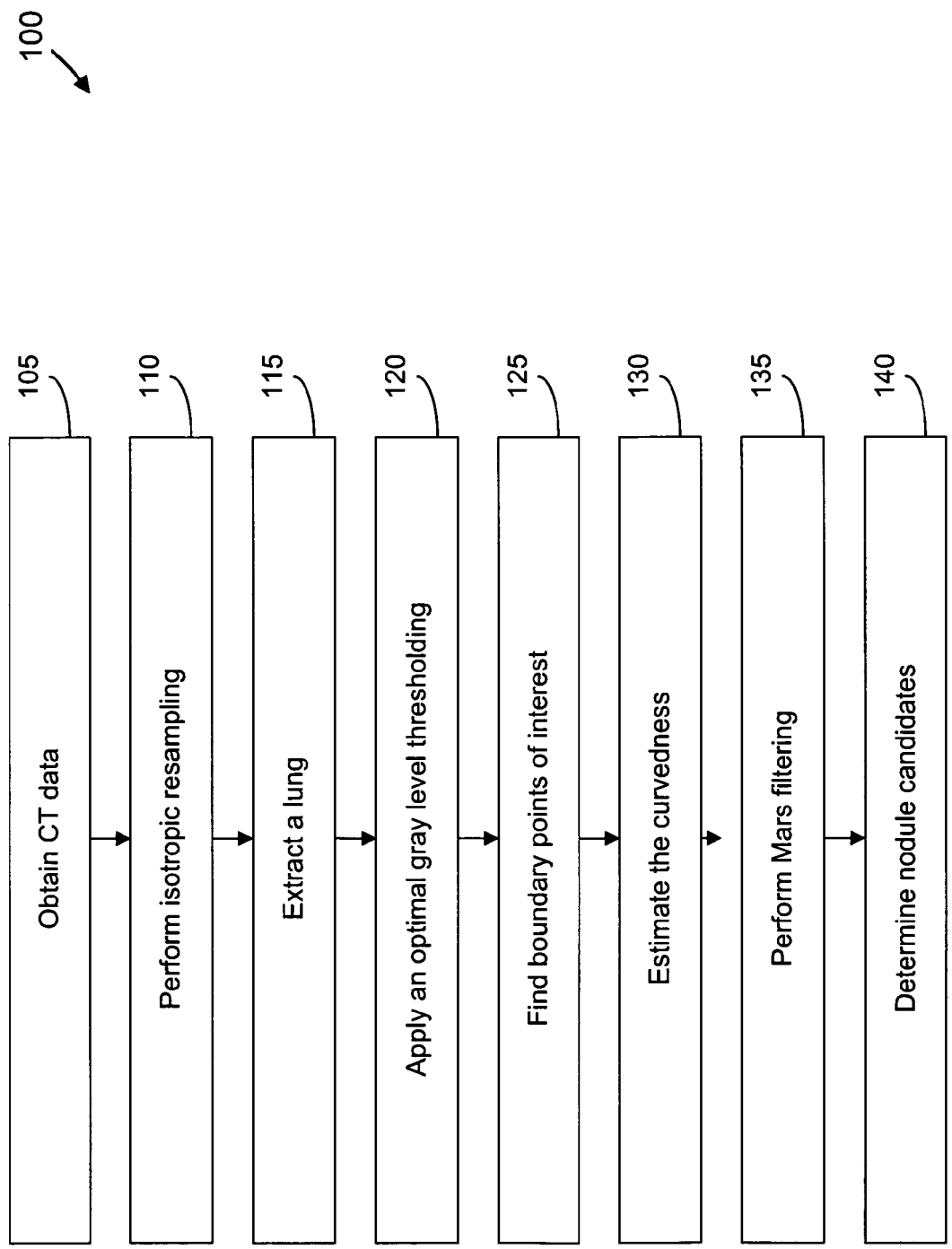
FIG. 1 depicts a 3D method for detecting nodules, in accordance with one exemplary embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We propose introducing a shape index in a weight voting scheme for detecting an object in an image. A shape index represents, typically in a single number, the local shape of an object. For example, in three dimensions ("3D"), a higher shape index indicates a local shape closer to a ball, while a lower shape index indicates a local shape closer to a hole.

We present, in exemplary embodiments of the present invention, a method of computing a local shape index (i.e., a shape feature) in a volume using second-order derivatives. However, it should be appreciated that other methods of computing a local shape index may be used, as contemplated by those skilled in the art. For example, one can similarly compute a local shape index using a structure tensor method, as describe in co-pending and commonly-assigned U.S. patent application Ser. No. 10/915,047 filed on Aug. 10, 2004, entitled "METHOD AND SYSTEM FOR USING STRUCTURE TENSORS TO DETECT LUNG NODULES AND COLON POLYPS," which is fully incorporated herein by reference.

Although not so limited, the exemplary embodiments provided herein are illustrated in the case of detecting lung nodules using a Mars filter. However, it should be appreciated that the present invention may be used to detect any of a variety of spherical or partially spherical objects, such as colon polyps and aneurysms. Further, the present invention can also be used, with only minor modifications, to detect other fundamental shapes, such as tubular or partially tubular structures (e.g., vessels, emboli), and saddle and bottleneck structures (e.g., polyp bases, vessel thinning). As used herein, it should be appreciated that the term "Mars filtering" refers to the concept of filtering described in co-pending and commonly-assigned patent application, SYSTEM AND METHOD FOR FILTERING A MEDICAL IMAGE, with Ser. No. 11/031,729, filed on Jan. 6, 2005, which is fully incorporated herein by reference.

Overall Scheme of Nodule Detection

Referring now to FIG. 1, a 3D method 100 for detecting nodules is shown. Original CT data is obtained (at 105), for example, using an imaging device. An isotropic resampling of the original CT data is performed (at 110) to obtain isotropic data. The isotropic data may be more suitable for 3D processing, with the three dimensions being treated equally. An entire lung is extracted (at 115) from the isotropic data, so that the successive processing is restricted to the pulmonary zone. An optimal gray level thresholding is applied (at 120) to the entire lung to obtain a high intensity non-air part, which may include nodules, vessels and airway walls. After the gray level thresholding, two choices are available for finding (at 125) boundary points of interest (i.e., the boundary). The first choice is directly based on the gray level thresholding results. The second choice is based on gradient magnitude, with the threshold being chosen by a P-tile thresholding method. For each voxel belonging to the boundary, surface curvatures of an iso-intensity surface are estimated (at 130). Based on surface curvatures, a local shape feature called the shape index is computed (at 135). The shape index feature may capture the shape differences among sphere-like nodules, tube-like vessels and airway walls. Also, the curvedness is estimated (at 140) to measure the size of the local structure. Mars filtering is performed (at 145) on the volume of interest based on the shape index and the curvedness estimation. Mars filtering processing adapts to the local structure by using the shape index information from the previous step. For each voxel in the volume of interest, the filtered value can be thought of as a score indicating the possibility of being the center of a nodule. The nodule candidates are determined (at 150) by finding the points in the filtered values that satisfy two criteria: (1) a candidate position is a local maximum point; and (2) the filtered value is higher than a predefined threshold. A candidate is a point whose filtered value is both above a predefined threshold and a local maxima.

The order of isotropic resampling and lung segmentation can be altered, as the segmentation mask based on the original data can also be converted to a mask based on isotropic data by a similar resampling procedure.

A more detailed description of the above-described nodule detection scheme will now be presented.

Nodule Model and Shape Feature

In CT scans, a pulmonary nodule usually shows a spherical structure, with the interior intensity clearly higher than the surrounding pulmonary parenchyma. According to the relationship with other high-intensity anatomical structures, lung nodules can be of two types: (1) an isolated nodule that is disjoint from other structures; and (2) a non-isolated nodule which attaches to other high intensity anatomical structures, including chest walls, vessels, and airway walls.

During the process of automatically detecting nodules within the lung, differentiating nodules from vessels and airway walls can become a major difficulty. On the one hand, non-isolated nodules may be prone to being treated as part of a vessel or airway structure, which decreases the sensitivity. On the other hand, many vessels may be incorrectly identified as nodules, which introduces many false positives ("FPs"). Therefore, a critical task is to find an efficient feature space capable of distinguishing between nodules and non-nodules.

Most proposed nodule detection schemes first use simple gray-level intensity value to obtain some suspected nodule areas ("SNAs"); then more complex features associated with each SNA are extracted and used for further classification. It is very possible that in the very beginning, a non-isolated nodule is segmented as a part of vessels nearby, so that it cannot be located afterwards.

Figure 2:
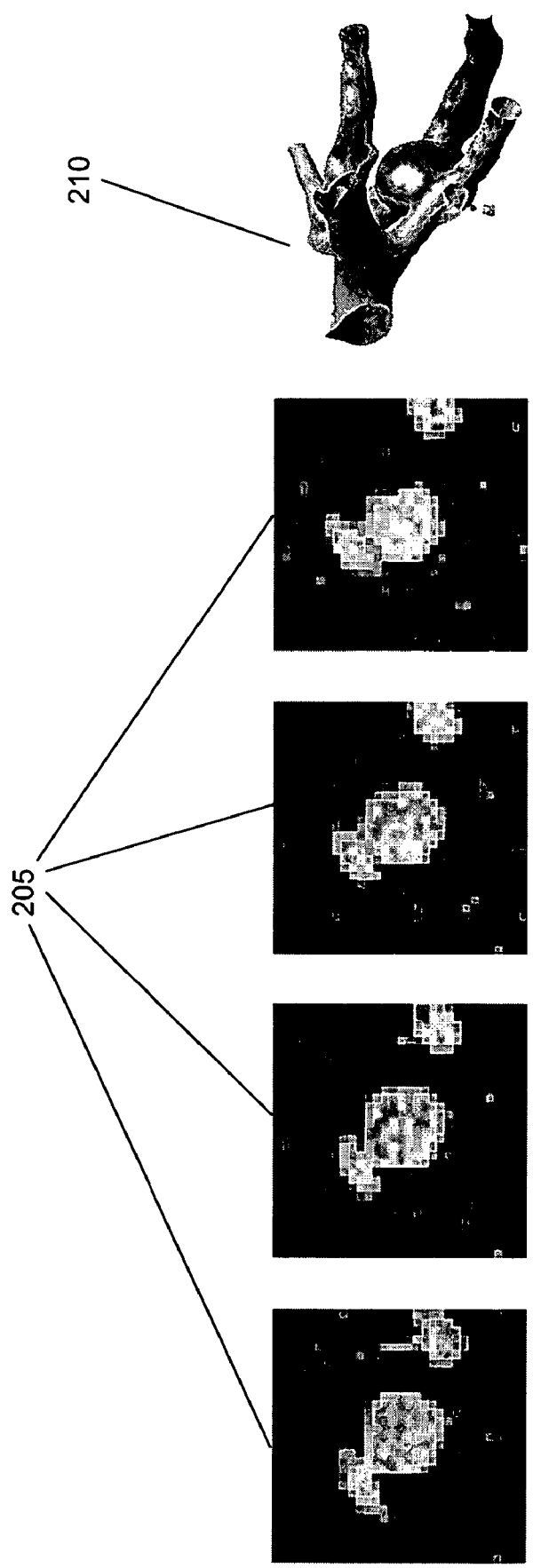
FIG. 2 depicts a plurality of CT images in which a nodule is attached to vessels, in accordance with one exemplary embodiment of the present invention.

Basic observations show that a nodule usually takes a sphere-like shape, while vessels and airway walls have tubular shapes. An example of this is shown in FIG. 2. Referring now to FIG. 2, a plurality of CT images are shown in which a nodule is attached to vessels. The left four images 205 are successive slices in axial view. The far right image 210 is an iso-surface rendering with the vertical direction being approximately the axial direction. The shape difference between nodules versus vessels and airway walls has been widely used to discriminate between nodules and non-nodules. But usually the shape property is used as a feature of a segmented object (i.e., a suspected nodule area ("SNA")). To avoid the situation of treating a non-isolated nodule as a part of attached structures, a shape feature is preferably used in the very beginning (i.e., before detection takes place) to include non-isolated nodules.

Mars Filter

Figure 3:
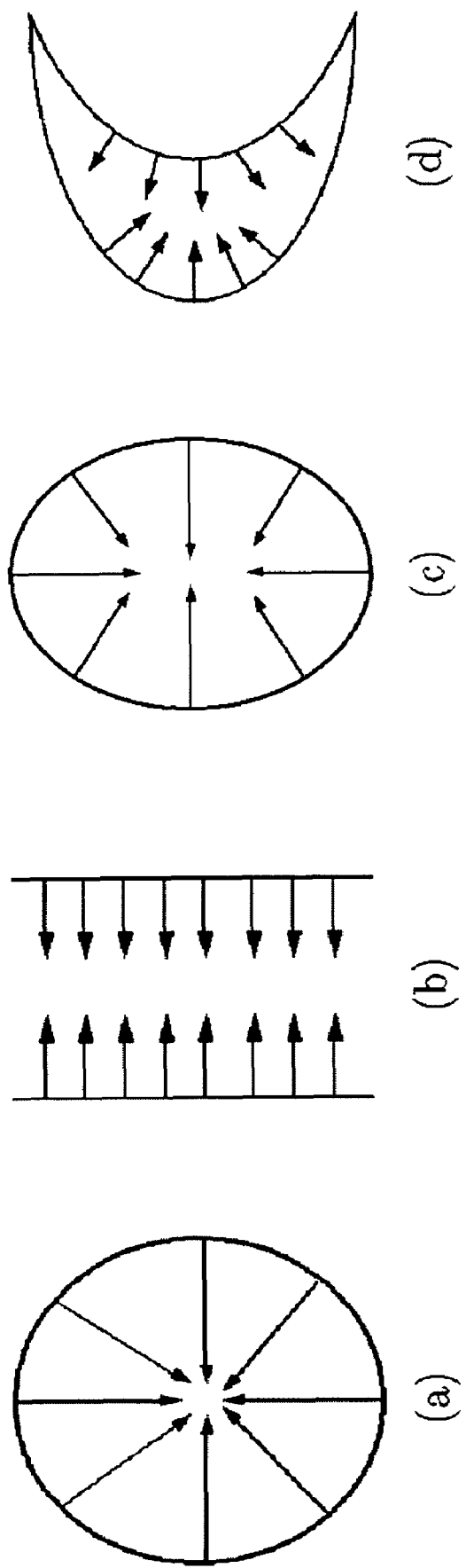
FIG. 3 depicts the varying distribution patterns of gradient vectors for a variety of object shapes.

To detect the sphere-like structure of nodules, a global structure enhancing method called Mars filtering may be utilized to capture how gradient vectors are concentrated at a specific point. As used herein, a gradient vector is considered to be a directed line starting from a specific point and extending to infinity. The basic idea of Mars filtering is illustrated in FIG. 3 for a 2D case. Assuming that the gradient vectors on the boundary of an object are towards inside, and perpendicular to the boundary (iso-lines for 2D or iso-surfaces for 3D), then the gradient vectors show different distribution patterns for objects with different shapes. Particularly, for an object with a perfect circle shape, as shown in FIG. 3(a), all the gradient vectors will meet exactly at the center of the circle. For an object with a line- or strap-like shape, as shown in FIG. 3(b) a gradient vector will never intersect another gradient vector on the same side, and only meet one gradient vector on the other side. For an ellipse, as shown in FIG. 3(c), the spatial distribution of gradient vectors is between a perfect circle and a perfect line, with gradient vectors in an ellipse being less concentrated than gradient vectors in a circle. For a more complicated shape with some part being convex and some part being concave, as shown in FIG. 3(d), for example, the gradient vectors starting from the convex part will concentrate in some way, and the gradient vectors starting from the concave part will diversify and never meet.

The situation for a 3D case is fairly similar to the 2D case, with a sphere having the most concentrated gradient vectors at the center, and a plane having parallel gradient vectors, a cylinder having parallel gradient vectors along the axis direction, and a 2D pattern in the surface of directrix.

With regard to 2D objects, for a circle with radius r, the "density" of gradient vectors at the center will be proportional to the line-density on the boundary and the circumference $2\pi r$. For a strap-like object, as shown in FIG. 3(b), the 'density' of gradient vectors inside the object will be no more than two times the line density on the boundary. With regard to 3D objects, for a sphere with the radius r, the "density" of gradient vectors at the center will be proportional to the surface density on the boundary and the area of the surface of the sphere $4\pi r^2$. For a cylinder with directrix being a circle with radius r, the 'density' of gradient vectors at the center line will be proportional the surface density on the boundary and the circumference of the circle $2\pi r$.

Based on the different distribution pattern of gradient vectors for different shapes, a filtering procedure using gradient vector can be designed to detect a circle-like structure (i.e., in the 2D case) or a sphere-like structure (i.e., in the 3D case) in digital images. For a pixel satisfying some boundary conditions, a tracking procedure may be performed along the gradient vector of that pixel, and each pixel along the path may be enhanced in some way. After all the boundary pixels are processed, the positions around the center of a circle (i.e., in the 2D case) or a sphere (i.e., in the 3D case) may have a higher value than their neighbors, and also a higher value than other non-circle or non-sphere structures. It should be noted that in digital images, the gradient should be estimated for a boundary pixel. This usually can be done by a finite difference method, or by some derivative filters (i.e., convolution).

Smoothing is usually needed to estimate gradient due to image noise. For the sake of simplicity, Gaussian smoothing is shown in the gradient estimation in this disclosure. However, other kinds of linear filtering may be used, as contemplated by those skilled in the art, such as spline kernels, Laplacian kernels. Further, non-linear filters, such as anisotropic diffusion, may also be used. Gaussian smoothing may be implemented by directly convolving the original data with the corresponding derivative of the Gaussian function. Another consideration may be the method of enhancing the path under tracking. A simple idea is to enhance each point along the path by a unit weight. The discrete property of digital images may increase the difficulty of enhancing each point in a "smooth" way. The idea of creating weights in tri-linear interpolation may give a solution, but generally requires a floating pointer operation. An integer operation, therefore, is preferred to maintain the time efficiency. This motivates a scheme to enhance a neighborhood rather than a single pixel nearest to the tracking path. Fore the sake of simplicity, cubic neighborhood with unit weights is illustrated in this disclosure. However, it should be appreciated any of a variety of other methods, such as binomial filtering and integer approximation of a Gauss filter can be used, as contemplated by those skilled in the art.

The tracking procedure can be controlled in some way to stop rather than going to infinity (e.g., for image with limited size, going to infinity means going outside the image). In a specific application, usually the maximum size of the object of interest is known in advance. This information can be used to set the maximum tracking distance. Ideally, half of the maximum size of the object of interest is enough to permit the tracking to reach the center of the object, but, in practice, the maximum tracking length should be chosen larger than the ideal case (e.g., half size of the largest object) due to the non-perfect shape. In an alternate embodiment, the tracking does not always need to reach the maximum tracking distance, as the nodule candidate position should be inside the high intensity objects. This leads to another criterion to stop the tracking—being outside the high intensity area. To apply this rule during Mars filtering, we need to distinguish between high intensity objects and low intensity background. Simple thresholding may be used to attain this goal.

Air/Non-air Segmentation Using Optimal Thresholding

In the previous section, a lung nodule was characterized as a high intensity, sphere-like area. Considering the high intensity property of nodules, the tracking procedure of Mars filtering can be applied only to the bright objects inside the lung, i.e., a region of interest ("ROI") can be obtained to reduce the amount of data being processed successively.

Optimal thresholding may be used to automatically determine a threshold for segmentation between the background (i.e., the air part) and objects (i.e., the non-air part, including chest walls, vessels, airway walls, nodules). This threshold selection method adapts to the small variations in tissue density across a population of subjects, and the possible linear transformations of the image value: The threshold may be detected iteratively. Let $T^t$ be the threshold at iteration step t, and $\mu_b^t$ and $\mu_o^t$ be the mean gray-level of background and objects. Variables $\mu_b^t$ and $\mu_o^t$ are obtained by applying $T^t$ to the image. Then for the next step t+1, the threshold is updated by $$T^{t+1} = \frac{\mu_b^t + \mu_o^t}{2}. \tag{1}$$

This updating procedure is iterated until the threshold does not change (i.e., $T^{t+1}=T^t$). The initial threshold value $T^0$ is chosen as the mean value of the whole image.

The tracking procedure of Mars filtering is applied only to the segmented object parts. This is implemented by adding a test of the pixel being tracked to see if the pixel has a value below the chosen threshold: if the pixel has a lower intensity value than the threshold, then the tracking procedure from the current starting position is stopped, and another tracking will start from the next qualified boundary position.

P-tile Thresholding for Gradient Magnitude

There are several possible ways of determining the boundary position from where the Mars tracking procedure starts. Given the segmentation results based on optimal thresholding, a boundary point can be defined as a pixel position inside the objects but having at least one background pixel in a local neighborhood. For the sake of simplicity, the local neighborhood of 3×3×3 is used in this disclosure. However, it should be appreciated that, in an alternative embodiment, a gradient magnitude may be used to decide the boundary position: if the gradient magnitude of a pixel is larger than a predefined threshold, then the pixel is considered as a boundary position from where Mars tracking starts.

Considering that the Mars tracking procedure depends on the gradient direction, it may be a good choice to choose a boundary position according to a gradient magnitude rather than a gray level property. One reason for this is that usually the boundary corresponding to a high value of gradient magnitude captures the meaningful shape of the objects, and the boundary determined by gray level thresholding sometimes is not able to reflect the shape information of interest. P-tile thresholding for gradient magnitude may be implemented to automatically select a threshold. This method assumes that we know that the boundary of interest accounts for a fixed percentage p of the whole image. Thus, it follows that a threshold T (based on the gradient magnitude histogram) may be easily chosen such that p of the gradient has magnitude larger than T. However, we do not usually have such definite prior information about area ratios. For the application of nodule detection, a statistical method may be used to obtain the p value for either gray level thresholding or gradient magnitude thresholding.

In this disclosure, a finite difference method is used to choose the gradient threshold, although Gaussian smoothing is used to estimate gradient vector used by Mars filtering. The reason is that we do not want to use a time-consuming method to attain the threshold detection, as we have to do the processing for all the pixel in the lung field for the gradient magnitude threshold detection.

Local Maximum Finding

After the Mars filtering, the positions around the center of a circle (i.e., in the 2D case) or a sphere (i.e., in the 3D case) will have a higher value than their neighbors, and also a higher value than other non-circle or non-sphere structures. So the positions of nodule candidates can be generated by a combination of thresholding and local maximum criterion. The neighborhood to check the local maximum criterion for a pixel is chosen as 3×3×3. A strong rule is to say that a pixel is a local maximum if only the value of that pixel is greater than all the neighbors. Alternatively, a weak rule to decide a local maximum is to say that a pixel is not less than all the neighbors. The strong rule possibly misses some nodules, if there are no positions around the center showing a dominance (i.e., there are several pixels near the center showing exactly same response to the Mars filter). For this situation, the weak rule will give many responses. Although these multiple responses can be merged in some cases, an extra procedure may be required. To avoid this situation, an improved local maximum criterion may be implemented. In this scheme, the strong rule and the weak rule are combined in the following way: for half of the neighborhood, the strong rule is used; for the other half, the weak rule is used.

Local Shape Features

According to the mathematical analysis for Mars filtering of 3D objects in the "Mars Filter" section above, the ratio of "density" of gradient vectors at the center between a sphere with the radius $r_1$ and a cylinder with radius $r_2$ will be $4\pi r_1^2$ to $2\pi r_2$. It is obvious that for a sphere and a cylinder having same radius r (assuming that r>1 for our applications), the sphere will have a higher density at the center than the cylinder. But if the radius $r_2$ of the cylinder is much larger than the radius $r_1$ of the sphere, it is possible that the cylinder will give a higher response than the sphere. For example, if $r_1=2$, $r_2=8$, then the response of the sphere is $16\pi$, and the response of the cylinder is also $16\pi$. Any cylinder with radius $r_2>8$ will have a higher response than a sphere with radius $r_1=2$. The above analysis shows that the Mars filter is not able to distinguish the ambiguities between a small size sphere and a possible large size cylinder.

Practically, a nodule is usually not perfectly spherical, which reduces the response of Mars filter. Further, a cylinder possibly has a distortion which makes it have a more concentrated gradient vectors at the center line. In addition, nodules attached to other high-intensity structures may show only spherical-like structures partly because, for example, a pleural nodule usually has only about a half part of a sphere surface. All of these factors can destroy the possible difference between nodules and non-nodules. To resolve these problems, we present a scheme that introduces local shape information to improve the Mars filter.

A local shape is a second order geometric invariant that is position and attitude independent. It can be completely described by its two principal curvatures (i.e., the maximal curvature $k_1$ and the minimal curvature $k_2$). Equivalently, the Gaussian curvature K and the mean curvature H can describe a local shape. The Gaussian curvature K numerically equals the product of the two principal curvatures (i.e., $K=k_1 \cdot k_2$) The mean curvature H is the arithmetic average of the two principal curvatures (i.e., $H=(k_1+k_2)/2$). In HK segmentation, image points can be labeled as belonging to a viewpoint-independent surface shape class type based on the combination of the signs from the Gaussian and Mean curvature.

Neither the HK curvatures pair nor the two principal curvatures pair capture the intuitive notion of "local shape" very well. In both schemes, two parameters are needed to "tell" the local shape. A single shape indicator would be preferred. Moreover, the shape indicator should be independent of the size (i.e., the amount of curvature). In one embodiment, two measures of local surface, "shape index" S and "curvedness" C, may be proposed. The shape index is scale-invariant and captures the intuitive notion of "local shape," whereas the curvedness specifies the amount of curvature. The shape index S and the curvedness C are defined as:

$$S = \frac{2}{\pi} \cdot \arctan\frac{k_1 + k_2}{k_1 - k_2 2}, \quad C = \sqrt{\frac{k_1^2 + k_2^2}{2}}, \quad \text{for } k_1 \geq k_2 \qquad (2)$$

The S and C decouple the shape and the magnitude of the curvatures. This is done by transforming a $k_1, k_2$ Cartesian coordinate description of a local shape into a polar coordinate system description. Every distinct shape, except for the plane, corresponds to a unique value of S. S=1 indicates a cap; S=−1 describes a cup; S=0.5 (i.e., ridge); and S=−0.5 (i.e., rut) correspond to parabolic points (i.e., cylindrical shapes). For 0<S<0.5, the local shape is a saddle (i.e., hyperbolic) ridge. For −0.5<S<0, saddle ruts are obtained. And symmetrical saddles have S=0. The range −1<S<−0.5 represents the concavities, and the range 0.5<S<1 represents the convexities. A plane has a zero value C and indeterminate S.

The use of SC scheme needs surface curvature information. Many methods of curvature computation for level surfaces have been used. The resulting formula is essentially identical, and a concise derivation is given. Next, the curvature computation is briefly described. By assuming the surface of interest to be a level surface (iso-intensity surface) locally, and using the normalized gradient as the reference normal, curvatures can be computed from up to the second order partial derivatives of the image function. Both the Gaussian curvature K and the mean curvature H have formulas symmetrical with respect to coordinates:

$$K = \frac{1}{(f_x^2 + f_y^2 + f_z^2)^2} \{f_x^2(f_{yy}f_{zz} - f_{yz}^2) + 2f_yf_z(f_{xy}f_{xz} - f_{xx}f_{yz}) + \\ f_y^2(f_{xx}f_{zz} - f_{xz}^2) + 2f_xf_z(f_{xy}f_{yz} - f_{xz}f_{yy}) + \\ f_z^2(f_{xx}f_{yy} - f_{xy}^2) + 2f_xf_z(f_{xz}f_{yz} - f_{xy}f_{zz})\} \quad (3)$$

$$H = \frac{-1}{2(f_x^2 + f_y^2 + f_z^2)^{3/2}} \{(f_y^2 + f_z^2)f_{xx} + (f_x^2 + f_z^2)f_{yy} + \\ (f_x^2 + f_y^2)f_{zz} - 2f_xf_yf_{xy} - 2f_xf_zf_{xz} - 2f_yf_zf_{yz}\} \quad (4)$$

The principal curvatures can be computed from K and H as follows:

$$k_{1,2} = H \pm \sqrt{H^2 - K} \quad (5)$$

Smoothing may be necessary for reliable curvature estimation. Gaussian smoothing is used in the partial derivatives estimation in this work. This is implemented by directly convolving the original data with the corresponding derivative of the Gaussian function.

Due to the fact that most nodules show a sphere-like structure, the shape index of each voxel belonging to the boundary of nodules should be around the value of 1, which corresponds to a spherical surface (i.e., cap) with higher intensity value inside and lower intensity value outside. Similarly, vessels have tube-like structures with high intensity inside, which is represented by the shape index value of 0.5. The situation for the airway walls may be more complicated, with the voxels near the outer surface having the shape index value of 0.5, and the voxels near the inner surface taking the value −0.5. Based on this observation, the shape index value can be used to differentiate between the boundary belonging to a nodule and the voxels corresponding to vessels and airway walls. It should be noted that the above difference in the shape index value between a nodule and vessels only makes sense for a population of voxels. For a single voxel, a shape index value around 1 does not guarantee its belonging to a nodule, and a value near 0.5 does not exclude the possibility of being part of a nodule either. What is needed is a processing step that synthesizes the information in a global view to give a more reliable result. Mars filtering is able to serve as the global level information processing tool.

Mars Filtering Driven by Local Shape Structure

In the original Mars filtering, every boundary point contributes a tracking procedure. In local shape driven Mars filtering, only boundary points satisfying some conditions stimulate a tracking processing. Further, the enhancement weights of Mars filter are adapted to reflect the difference of local shapes.

Specifically, to exclude vessels (which have tubular structures with the shape index value of 0.5), airways (with the voxels near the outer surface having the shape index value of 0.5, and the voxels near the inner surface taking the value −0.5), a threshold $S_t$ can be set so that all boundary points with local shape index $S < S_t$ is prohibited from a Mars tracking procedure. Experiments show that $S_t = 0.5$ may be a good choice. And for boundary points with local shape index $S > S_t$, a Mars tracking procedure is started, with the weights being $(S − S_t)/b$, r to enhance sphere-like structures. Here, b is a coefficient to determine the weight difference due to shape difference. Experiments show that b=0.1 is a good choice.

It is also possible to use curvedness C to drive the Mars filter. If a boundary point has a very small curvedness (indicating a possible large size), it is probably located at the slow changing pleural surface or lobe surface, rather than at the boundary of a nodule (usually the nodules of interest having limited size). Based on this idea, we can set a upper bound threshold $C_u$ so that all boundary points with curvedness $C < C_u$ is prohibited from a Mars tracking procedure. For small nodule detection, experiments show that $C_u = 0.2$ is a good choice. $C_u = 0.2$ approximately corresponds to the curvedness of a perfect sphere with radius 5 pixels (for a 7 mm nodule). Due to the non-perfect spherical shape of nodules, usually this threshold corresponds to a nodule larger than 7 mm. We can also set a lower bound threshold $C_l$ so that all boundary points with curvedness $C > C_l$ is prohibited from a Mars tracking procedure, to reduce the response from structures that are too small. Experiments show that it is difficult to choose an appropriate threshold for small nodule detection. Thus, this lower bound threshold strategy is preferably not used. A similar modification to the weights may also be implemented.

Isotropic Resampling

To improve the efficiency of our 3D detection scheme, the original non-isometric data (i.e., different physical resolution in x, y, z directions) should be resampled to generate isometric data (i.e., same physical resolution in x, y, z directions). The isometric data are more suitable for 3D processing because all of the three directions can be treated exactly in the same way. This simplifies the structure of the Mars filter. Further, the 3D differential characteristics can be estimated more conveniently. For example, tri-linear interpolation may be employed to obtain the isotropic data. Considering the original image resolution, the cubic voxel size of 0.7 mm is always produced.

Various terminology will now be defined. A local shape descriptor describes the local intensity distribution in an image. A global shape is characterized by a distribution of intensity values over a larger scale. A spread function determines what the influence of a voxel with a certain local shape descriptor is on the response value for the global shape at any other voxel in the image.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for calculating a response value at a first voxel indicative of a global shape in an image, comprising the steps of:
   a. determining a value for each of at least one local shape descriptor at the first voxel;
   b. determining a spread function associated with the each of the at least one local shape descriptor;
   c. determining second voxels around the first voxel;

d. calculating, in a processor, values for each the at least one local shape descriptor at each of the second voxels;
e. determining a contribution of each of the second voxels at the first voxel based on the spread functions; and
f. using a combination function to combine the contributions to determine the response value indicative of the global shape.

2. The method of claim 1 wherein the step of determining at least one local shape descriptor comprises:
computing a shape index based on a curvature.

3. The method of claim 2, wherein the step of computing a shape index based on a curvature comprises:

$$S = \frac{2}{\pi} \cdot \arctan \frac{k_1 + k_2}{k_1 - k_2 2}, \text{ for } k_1 \geq k_2$$

wherein $k_1$ is a maximal curvature and $k_2$ is a minimal curvature.

4. The method of claim 1, wherein the step of determining at least one local shape descriptor comprises:
estimating a curvedness based on a curvature.

5. The method of claim 4, wherein estimating a curvedness based on a curvature comprises:

$$C = \sqrt{\frac{k_1^2 + k_2^2}{2}}, \text{ for } k_1 \geq k_2$$

wherein $k_1$ is a maximal curvature and $k_2$ is a minimal curvature.

6. The method of claim 1, wherein the step of determining a spread function comprises:
determining a spread function that has a main orientation.

7. The method of claim 6, further comprising the step of:
calculating the main orientation using a gradient.

8. The method of claim 1, further comprising the step of:
calculating a value of a global spread function using an intensity value at the first voxel.

9. The method of claim 1, wherein the step of determining a spread function comprises:
determining a function of the at least one local shape descriptor of at least zero local shape descriptors of other second voxels.

10. The method of claim 1, wherein the step of determining at least one local shape descriptor comprises determining local intensity value.

11. The method of claim 1, wherein the step of determining a spread function comprises determining a spread function of value zero if no path of connected voxels having intensities within a certain interval between the first voxel and the second voxels exists.

12. The methods of claim 1, wherein the step of determining at least one local shape descriptor comprises determining a local gradient.

13. The method of claim 1, further comprising the step of:
detecting candidates.

14. The method of claim 13, wherein the step of detecting candidates comprises:
selecting candidate voxels in the image where the response value is strongly indicative of the global shape;
obtaining the candidate voxels by at least one of (a) thresholding the response value, and (b) obtaining a local maxima.

15. The method of claim 1, wherein the step of using a combination function to combine the contributions to determine the response value indicative of the global shape comprises:
using a combination function to combine the contributions to determine the response value indicative of one of a spherical shape, a partially-spherical shape, a tubular shape, a partially-tubular shape, and a saddle and bottleneck shape.

16. The method of claim 1, wherein the step of using a combination function to combine the contributions to determine the response value indicative of the global shape comprises:
using a combination function to combine the contributions to determine the response value indicative of an intensity distribution representing at least one of a lung nodule, a colon polyp, an aneurysm, a vessel, an emboli, a polyp base and a vessel thinning.

17. A computer-readable medium having instructions stored thereon for execution by a processor to perform a method for calculating a response value at a first voxel indicative of a global shape in an image, the method comprising:
a. determining at least one local shape descriptor associated with each of the at least one local descriptor;
b. determining a spread function associated with the each of the at least one local shape descriptor;
c. determining second voxels around the first voxel;
d. calculating values for each the at least one local shape descriptor at each of the second voxels;
e. determining a contribution of each of the second voxels at the first voxel based on the spread functions; and
f. using a combination function to combine the contributions to determine the response value indicative of the global shape.

18. A method for enhancing the detection specificity of the MARS filter in an image, wherein the image comprises image points, comprising the steps of:
determining, in a processor, at least one local shape descriptor by computing a shape index based on a curvature;
determining local shape descriptor points based on a value of the at least one local shape descriptor, wherein the local shape descriptor points comprise at least a subset of the image points; and
performing MARS tracking using the local shape descriptor points.

19. The method of claim 18, further comprising the step of:
determining threshold points from the image points using at least one of
(a) thresholding an intensity of the image for determining the threshold points, and
(b) thresholding a gradient magnitude of the image for determining the threshold points.

20. The method of claim 19, further comprising the step of:
intersecting the threshold points and the local shape descriptor points to obtain at least a subset of the local shape descriptor points for the step of performing MARS tracking.

* * * * *